United States Patent [19]

Okamoto

[11] 3,930,266

[45] Dec. 30, 1975

[54] CONTROL SYSTEM FOR A RECORDING/REPRODUCING APPARATUS

[76] Inventor: Hiroshi Okamoto, Simoakasaka 689-7, Kawagoe, Saitama, Japan

[22] Filed: Jan. 24, 1974

[21] Appl. No.: 436,199

[30] Foreign Application Priority Data

Jan. 31, 1973 Japan ................................ 48-13150

[52] U.S. Cl. .................... 360/62; 360/55; 307/291

[51] Int. Cl.[2] ........................................ G11B 15/12

[58] Field of Search ........ 360/62, 55; 307/289, 290, 307/291; 328/203; 206, 200

[56] References Cited

UNITED STATES PATENTS

| | | | |
|---|---|---|---|
| 3,347,996 | 10/1967 | Uchikoshi | 360/62 |
| 3,624,424 | 11/1971 | Ping | 307/215 |

*Primary Examiner*—Bernard Konick
*Assistant Examiner*—Alan Faber

[57] ABSTRACT

In order to condition the recording/reproducing apparatus for forward playback, reverse playback, recording and like operations, a plurality of normally open control switches are connected to the set terminals of their respective flip-flop circuits via bias terminals through which a prescribed positive voltage is normally applied to the set terminals. Upon closure of a desired control switch, the adjacent bias terminal is grounded therethrough to introduce the ground potential to the set terminal of the corresponding flip-flop circuit and hence to trigger the same, thereby causing the apparatus to initiate the desired operation. The control system may include an additional control switch adapted to condition the apparatus for a "pause," such that upon closure of this control switch during forward recording operation, for example, the flip-flop circuit for the forward motion of the record medium is reset whereas the flip-flop circuit for recording operation is held in a set condition. The apparatus is thus held standing by for immediate resumption of recording operation.

1 Claim, 16 Drawing Figures

CONTROL SYSTEM FOR A RECORDING/REPRODUCING APPARATUS

BACKGROUND OF THE INVENTION

This invention relates generally to recording/reproducing apparatus and in particular is directed to a control system for a recording/reproducing apparatus such as, perhaps most suitably, that which is commonly known as a tape recorder. It is to be understood, however, that by the term "recording/reproducing apparatus" as used herein and in the appended claims is meant any apparatus capable of performing recording and/or reproducing operation, unless otherwise noted specifically.

Generally, the control systems of tape recorders are composed of relays and associated contacts, and for insulation purposes a low supply voltage is usually employed to operate low voltage relays. The relays coils are thus required to carry a current of relatively high value. As a consequence, the contacts are highly susceptible to sparking and to resulting damage, and the sparks can further be converted into clicks via the amplifier of the tape recorder. It has therefore been almost impossible to expect highly reliable performance from the prior art control systems for tape recorders and like recording/reproducing apparatus.

SUMMARY OF THE INVENTION

In view of the noted deficiencies of the prior art, it is an object of this invention to provide a control system for a recording/reproducing apparatus which operates in a highly reliable manner with small voltage and current values, so that the possibility of sparking is substantially eliminated.

Another object of the invention is to provide a control system wherein the production of any noise signals is prevented which might cause the erroneous operation of the recording/reproducing apparatus.

A further object of the invention is to provide a control system which permits the apparatus to be conditioned unfailingly for its intended operation upon actuation of a desired one of several control switches of pushbutton or other type.

A further object of the invention is to provide a control system which permits the apparatus to be easily conditioned for a "pause" or a standby condition for immediate initiation of recording operation.

A still further object of the invention is to provide a control system of relatively simple and inexpensive circuit configuration, such that the system can easily be incorporated in recording/reproducing apparatus of known construction.

Briefly summarized in accordance with a preferred embodiment of the invention, the control system includes a plurality of normally open control switches which are manually actuable to condition the recording/reproducing apparatus for operations such as forward playback, reverse playback, recording, pause, and stop, respectively. Of these the control switches for the forward playback, reverse playback, and recording operations of the apparatus are connected to the set terminals of their respective flip-flop circuits via bias terminals through which a positive voltage is normally held applied to the set terminals, while the control switch for stopping the operation of the apparatus is connected to the reset terminals of all the flip-flop circuits.

Thus, upon closure of a desired control switch for some operation of the apparatus, the adjacent bias terminal is grounded therethrough to introduce the ground potential to the set terminal of the corresponding flip-flop circuit and hence to trigger the same, thereby causing the apparatus to initiate the desired operation. This operation can be terminated by closing the stop which because then the flip-flop circuit is thereby reset. Further, upon closure of the pause switch during forward recording operation, the flip-flop circuit for the forward motion of the record medium is reset whereas the flip-flop circuit for recording operation is held in a set condition, so that the apparatus will immediately resume the forward recording operation when the switch for the forward motion of the record medium is succeedingly closed.

The features which are believed to be novel and characteristic of this invention are set forth with particularity in the appended claims. The invention itself, however, both as to its configuration and mode of operation, together with the further objects and advantages thereof, will be best understood from the following description taken in conjunction with the accompanying drawings which illustrate, by way of example only, a preferred embodiment of the invention.

DESCRIPTION OF THE PREFERRED EMBODIMENT

The control system according to the invention will now be described in detail with reference to FIG. 1 which illustrates the system as adapted specifically for use with a recording/reproducing apparatus of the well known type utilizing a reelable magnetic tape as the record medium and hence usually referred to as the tape recorder. The circuitry of FIG. 1 is broadly composed of a circuit to control the forward motion of the magnetic tape, another circuit to control the reverse motion of the tape, and yet another circuit to control the recording operation of the apparatus, as hereinafter set forth in more detail.

Figure 1:
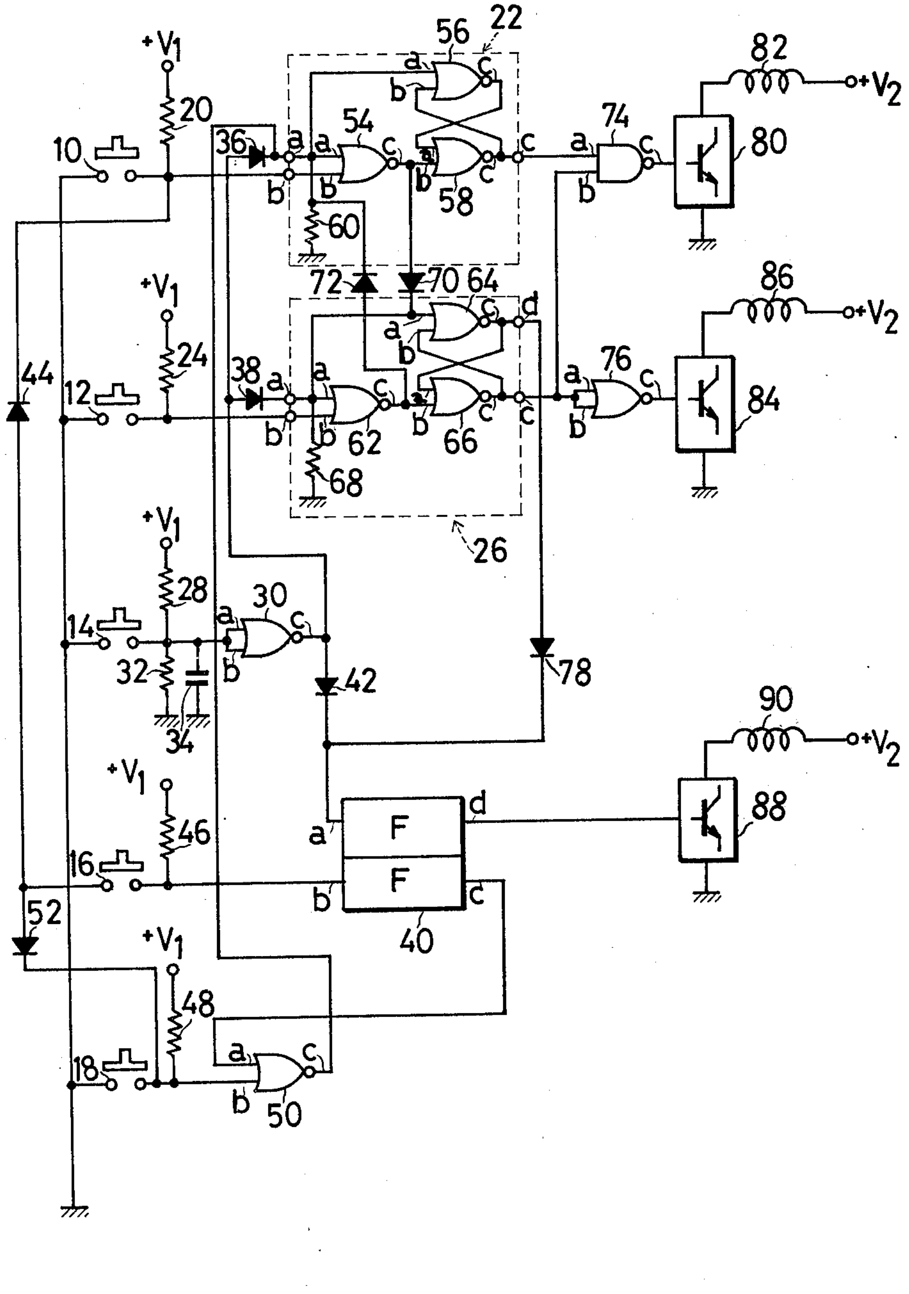
FIG. 1 is a schematic electrical diagram of a control system according to the concepts of this invention.

Seen to the left in FIG. 1 are five normally open control switches 10, 12, 14, 16 and 18 which preferably are all of pushbutton type and which can be conveniently arranged on the mounting panel of the recording/reproducing apparatus. As will be more clearly understood from the succeeding description, the first control switch 10 is adapted to condition the apparatus for forward playback operation and is therefore hereinafter referred to as the "forward playback switch." The second control switch 12 is adapted to condition the apparatus for reverse playback operation and is hereinafter referred to as the "reverse playback switch." The third control switch 14 is adapted to stop the operation of the apparatus and is hereinafter referred to as the "stop switch." The fourth control switch 16 is adapted to condition the apparatus for recording operation and is hereinafter referred to as the "recording switch." The fifth control switch 18 is adapted to condition the apparatus for a "pause" or a temporary stop in the motion of the tape and is hereinafter referred to as the "pause switch."

In the recording/reproducing apparatus of this type, there is provided a further control switch, not shown, for fast winding of the tape either in its forward or reverse direction. Thus, the apparatus will be conditioned for fast forward operation when the forward playback and fast winding switches are both closed, and for fast reverse operation when the reverse playback and fast winding switches are both closed. As may have been understood from the foregoing description of the control switches, the recording/reproducing apparatus to which is directed this particular embodiment of the invention is of the known type permitting both recording and playback operations to be performed during the forward motion of the tape and playback operation only during the reverse tape motion. For the recording operation during the forward tape motion, therefore, the forward playback and recording switches 10 and 16 must both be closed.

As may already be familiar to those in the art, the aforesaid "pause" is such that if the pause switch 18 is closed during recording operation, the forward motion of the tape will be suspended while the pertinent electrical circuit of the apparatus is still held ready for recording operation. Accordingly, if the forward playback switch 10 is succeedingly re-closed, the recording operation can be resumed without any substantial waste of time. It may further be noted that by the closure of both of the recording and pause switches 16 and 18, the apparatus can always be set in a pause, that is, held standing by for immediate recording operation, as will be later explained in further detail.

Referring now more specifically to FIG. 1, one of the two fixed contacts of the forward playback switch 10 is grounded, while the other fixed contact is connected, on the one hand, to a bias terminal labelled as +V1 (by which is meant that a prescribed positive voltage is impressed through this terminal upon closure of the power switch) via a resistance 20 and, on the other hand, to the input terminal *b* of a first flip-flop circuit generally designated by the numeral 22. Similarly, one of the fixed contacts of the reverse playback switch 12 is grounded, while the other fixed contact of this switch is connected, on the one hand, to a bias terminal +V1 via a resistance 24 and, on the other hand, to the input terminal *b* of a second flip-flop circuit 26.

One of the fixed contacts of the stop switch 14 is likewise grounded, while the other fixed contact of the stop switch is connected, on the one hand, to a bias terminal +V1 via a resistance 28 and, on the other hand, to the input terminals *a* and *b* of a NOR circuit 30, besides being grounded via a resistance 32 and further grounded via a capacitor 34. The output terminal *c* of the NOR circuit 30 is connected to the input terminal *a* of the first flip-flop circuit 22 via a reverse blocking diode 36, to the input terminal *a* of the second flip-flop circuit 26 via a diode 38, and to the reset terminal *a* of a third flip-flop circuit 40 via a diode 42.

One of the fixed contacts of the recording switch 16 is connected via a diode 44 to the point of interconnection of the forward playback switch 10 and the first flip-flop circuit 22 and can thus be grounded via the switch 10. The other fixed contact of the recording switch 16 is connected, on the one hand, to a bias terminal +V1 via a resistance 46 and, on the other hand, to the set terminal *b* of the third flip-flop circuit 40.

One of the fixed contacts of the pause switch 18 is grounded, while the other fixed contact of this pause switch is connected to a bias terminal +V1 via a resistance 48, to the input terminal *b* of a NOR circuit 50, and to the said one fixed contact of the recording switch 16 via a diode 52.

The first flip-flop circuit 22 is broadly composed of a NOR circuit 54 functioning as a gate and an additional pair of NOR circuits 56 and 58 functioning in combination as a flip-flop. The input terminal *a* of this first flip-flop circuit 22 is connected to the input terminal *a* of the NOR circuit 54 and to the input terminal *a* of the NOR circuit 56, besides being grounded via a resistance 60. The other input terminal *b* of the first flip-flop circuit 22 is connected to the input terminal *b* of the NOR circuit 54, and the output terminal *c* of this NOR circuit 54 is connected to the input terminal *b* of the NOR circuit 58. The output terminal *c* of the NOR circuit 56 is connected to the input terminal *a* of the NOR circuit 58, and the output terminal *c* of this NOR circuit 58 is connected, on the one hand, to the input terminal *b* of the NOR circuit 56 and, on the other hand, to the output terminal *c* of the first flip-flop circuit 22.

The second flip-flop circuit 26 is of similar configuration, comprising three NOR circuits 62, 64 and 66. The input terminal *a* of this second flip-flop circuit is connected to the input terminal *a* of the NOR circuit 62 and also to the input terminal *a* of the NOR circuit 64, besides being grounded via a resistance 68. Also connected to the input terminal *a* of the NOR circuit 64 via a diode 70 is the output terminal *c* of the NOR circuit 54 of the first flip-flop circuit 22. The other input terminal *b* of the second flip-flop circuit 26 is connected to the input terminal *b* of the NOR circuit 62 functioning as a gate, and the output terminal *c* of this NOR circuit 62 is connected, on the one hand, to the input terminal *b* of the NOR circuit 66 and, on the other hand, to the input terminal *a* of the first flip-flop circuit 22 via a diode 72. The output terminal *c* of the NOR circuit 64 is connected, on the one hand, to the input terminal *a* of the NOR circuit 66 and, on the other hand, to the output terminal *d* of the second flip-flop circuit 26. Similarly, the output terminal *c* of the NOR circuit 66 is connected, on the one hand, to the input terminal *b* of the NOR circuit 64 and, on the other hand, to the output terminal *c* of the second flip-flop circuit 26.

Although the third flip-flop circuit 40 is illustrated in the form of blocks in FIG. 1, it is to be understood that this third flip-flop circuit is of identical configuration with the first and second flip-flop circuits 22 and 26 set forth in the foregoing. Thus, the terminals *a, b, c* and *d* of the third flip-flop circuit 40 correspond to the respective terminals *a, b, c* and *d* of the second flip-flop circuit 26.

The output terminal *c* of the first flip-flop circuit 22 is connected to the input terminal *a* of a NAND circuit 74. The output terminal *c* of the second flip-flop circuit 26 is connected, on the one hand, to the input terminals *a* and *b* of a NOR circuit 76 and, on the other hand, to the input terminal *b* of the aforesaid NAND circuit 74. The other output terminal *d* of the second flip-flop circuit 26 is connected to the input terminal *a* of the third flip-flop circuit 40 via a diode 78.

The output terminal *c* of the NAND circuit 74 is connected to the base of the transistor in a first transistor switch circuit 80 which is serially connected to a first relay 82 and thence to a bias terminal labelled as +V2. Although not shown in the drawing, it is assumed that this first relay 82 is electrically connected to the recording/reproducing apparatus in such a manner that upon energization of the first relay 82, the magnetic tape of the apparatus will be caused to travel forwardly from the feed reel to the take-up reel along its predetermined path for forward playback operation.

The output terminal *c* of the NOR circuit 76 is likewise connected to the base of the transistor in a second transistor switch circuit 84 which is serially connected to a second relay 86 and thence to a bias terminal +V2. This second relay 86 is assumed to be electrically connected to the recording/reproducing apparatus in such a manner that upon energization of the second relay 86, the magnetic tape will be caused to travel in its reverse direction, with the reverse playback head of the apparatus activated for reverse playback operation.

The output terminal *d* of the third flip-flop circuit 40 is connected directly to the base of the transistor in a third transistor switch circuit 88 which is serially connected to a third relay 90 and thence to a bias terminal +V2. This third relay 90 is assumed to be electrically connected to the apparatus in such a manner that upon energization of the third relay 90, the apparatus will be conditioned for recording operation during the forward motion of its tape. The other output terminal *c* of the third flip-flop circuit 40 is connected to the input terminal *a* of the NOR circuit 50, and the output terminal *c* of this NOR circuit 50 is connected to the input terminal *a* of the first flip-flop circuit 22 in order to reset the same upon closure of the pause switch 18.

The operation of this preferred embodiment of the invention is described hereinbelow with particular reference to the graphs of FIG. 2, in which the letters *a*, *b*, *c* and *d* represent the respective terminals of the correspondingly noted circuit element or component shown in FIG. 1 and in which the hatched portions represent a HI level signal corresponding to the binary ONE while the unhatched portions represent a LO level signal corresponding to the binary ZERO unless otherwise noted.

STOP

Figures 2A, 2B, 2C, 2D, 2E, 2F:
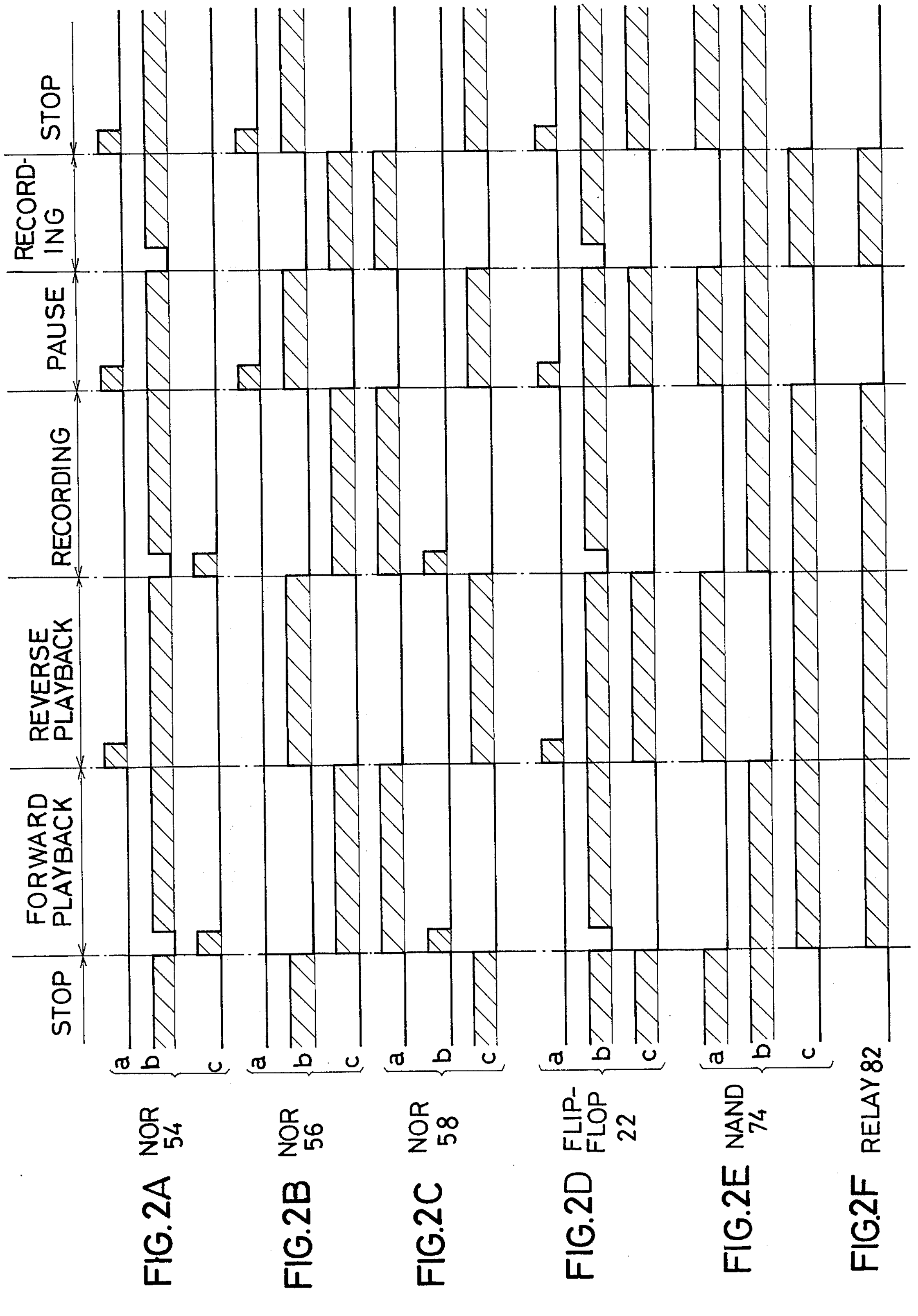
FIGS. 2A to 2—O inclusive are graphic representations of electrical signals applied to various elements and components of the circuitry of FIG. 1 in the operation of the control system.
Figures 2G, 2H, 2I, 2J, 2K, 2L:
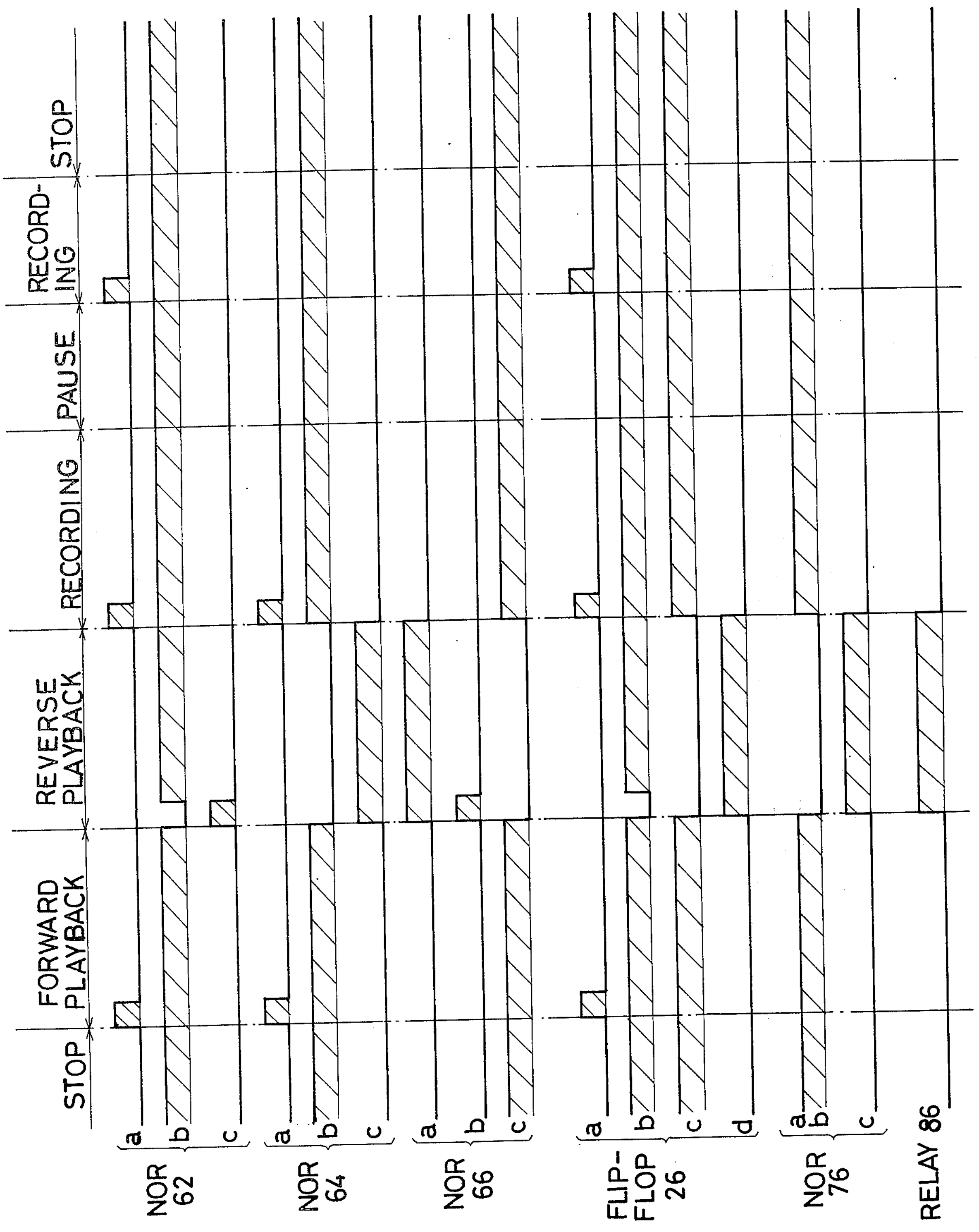

When the stop switch 14 is closed to stop the operation of the recording/reproducing apparatus, with the power switch (not shown) of the apparatus held closed, a LO level signal is produced from the output terminal *c* of the NAND circuit 74, as seen in FIG. 2E, so that the first transistor switch circuit 80 is opened. The first relay 82 is then no longer energized by the positive voltage from the bias terminal +V2, as seen in FIG. 2F, thereby preventing the forward motion of the magnetic tape. A LO level signal is likewise produced from the output terminal *c* of the NOR circuit 76, as seen in FIG. 2K, so that the second relay 86 is also deenergized as in FIG. 21. Thus the reverse motion of the tape does not take place either.

Forward Playback

Upon closure of the forward playback switch 10, the input terminal *b* of the first flip-flop circuit 22 assumes the ground potential, that is, is supplied with a LO level signal as in FIG. 2D. As a consequence, the input terminals *a* and *b* of the NOR circuit 54 are both supplied with LO level signals, so that its output terminal *c* produces a HI level signal as in FIG. 2A. This HI level output signal from the NOR circuit 54 is delivered to the input terminal *b* of the NOR circuit 58 thereby causing the same to produce a LO level signal from its output terminal *c* as in FIG. 2C. This LO level output signal from the NOR circuit 58 is delivered to the input terminal *b* of the NOR circuit 56, and since the input terminals *a* and *b* of the latter are then both supplied with LO level signals, a HI level signal is produced from the output terminal *c* of this NOR circuit 56 as seen in FIG. 2B.

The LO level signal from the output terminal *c* of the first flip-flop circuit 22, indicated in FIG. 2D, is delivered to the input terminal *a* of the NAND circuit 74, the other input terminal *b* of which is then supplied with a HI level signal, so that the output terminal *c* of the NAND circuit 74 produces a HI level signal as seen in FIG. 2E. The transistor in the first transistor switch circuit 80 is thereby rendered conductive to cause energization of the first relay 82 by the positive voltage supplied through its bias terminal +V2 as seen in FIG. 2F. The recording/reproducing apparatus is thus conditioned for, and caused actually to perform, the desired forward playback operation.

It is noteworthy that if the recording switch 16 is inadvertently closed by the operator during this forward playback operation, no setting signal is delivered to the third flip-flop circuit 40 because now the forward playback switch 10 is opened, so that there is no possibility of accidentally erasing the information recorded on the magnetic tape.

Reverse Playback

For a shift from forward playback to reverse playback operation, either the reverse playback switch 12 may be manually closed, or the end of the tape in its forward motion may be automatically detected as by means of a sensing pole (not shown) in accordance with the prior art, with the result that the input terminal *b* of the second flip-flop circuit 26 assumes the ground potential or is supplied with a LO level signal as seen in FIG. 2J. The output terminal *c* of the NOR circuit 62 is thus caused to produce a HI level signal, which signal is delivered, on the one hand, to the input terminal *a* of the first flip-flop circuit 22 via the diode 72. The first flip-flop circuit 22 is thus reset instantaneously, and its output terminal *c* starts producing a HI level signal again as seen in FIG. 2D.

On the other hand, the HI level output signal from the NOR circuit 62 is simultaneously delivered to the input terminal *b* of the NOR circuit 66 in the second flip-flop circuit 26, so that the output terminal *c* of this NOR circuit 66 starts producing a LO level signal as seen in FIG. 2I. This LO level output signal from the NOR circuit 66 is delivered to the input terminal *b* of the NOR circuit 64 thereby causing the same to produce a HI level signal from its output terminal *c*.

The LO level signal from the output terminal *c* of the second flip-flop circuit 26 is delivered, on the one hand, to the input terminal *b* of the NAND circuit 74 and, on the other hand, to the input terminals *a* and *b* of the NOR circuit 76. Since the two input terminals of the NAND circuit 74 are supplied with the HI and LO level output signals from the first and second flip-flop circuits 22 and 26, respectively, its output terminal *c* produces a HI level signal as seen in FIG. 2E. The first transistor switch circuit 80 is thus held closed as in the case of forward playback operation, so that the first relay 82 is also held energized as seen in FIG. 2F. As the LO level signal is delivered as aforesaid to the input terminals *a* and *b* of the NOR circuit 76, a HI level signal is produced from its output terminal *c* as seen in FIG. 2K thereby closing the second transistor switch circuit 84. The second relay 86 is now energized as seen in FIG. 2L, with the result that the apparatus is switched from forward playback to reverse playback operation.

Since the NOR circuit 64 in the second flip-flop circuit 26 is caused to produce a HI level signal from its output terminal *c* as previously mentioned, this HI level signal is delivered from the output terminal *d* of the second flip-flop circuit to the reset terminal *a* of the third flip-flop circuit 40 via the diode 78. The third flip-flop circuit 40 can thus be held reset during the reverse playback operation.

Recording

For a shift from reverse playback to forward recording operation, the forward playback and recording switches 10 and 16 must both be manually closed. The input terminal *b* of the first flip-flop circuit 22 is then supplied with a LO level signal, and the set terminal *b* of the third flip-flop circuit 40 is also supplied with a LO level signal. Thus, as seen in FIG. 2D, the first flip-flop circuit 22 is caused to produce a LO level signal from its output terminal *c*, and as seen in FIG. 2J the second flip-flop circuit 26 is caused to start producing a HI level signal from its output terminal *c* by the signal supplied from the first flip-flop circuit 22 via the diode 70.

Figures 2M, 2N, 2O:
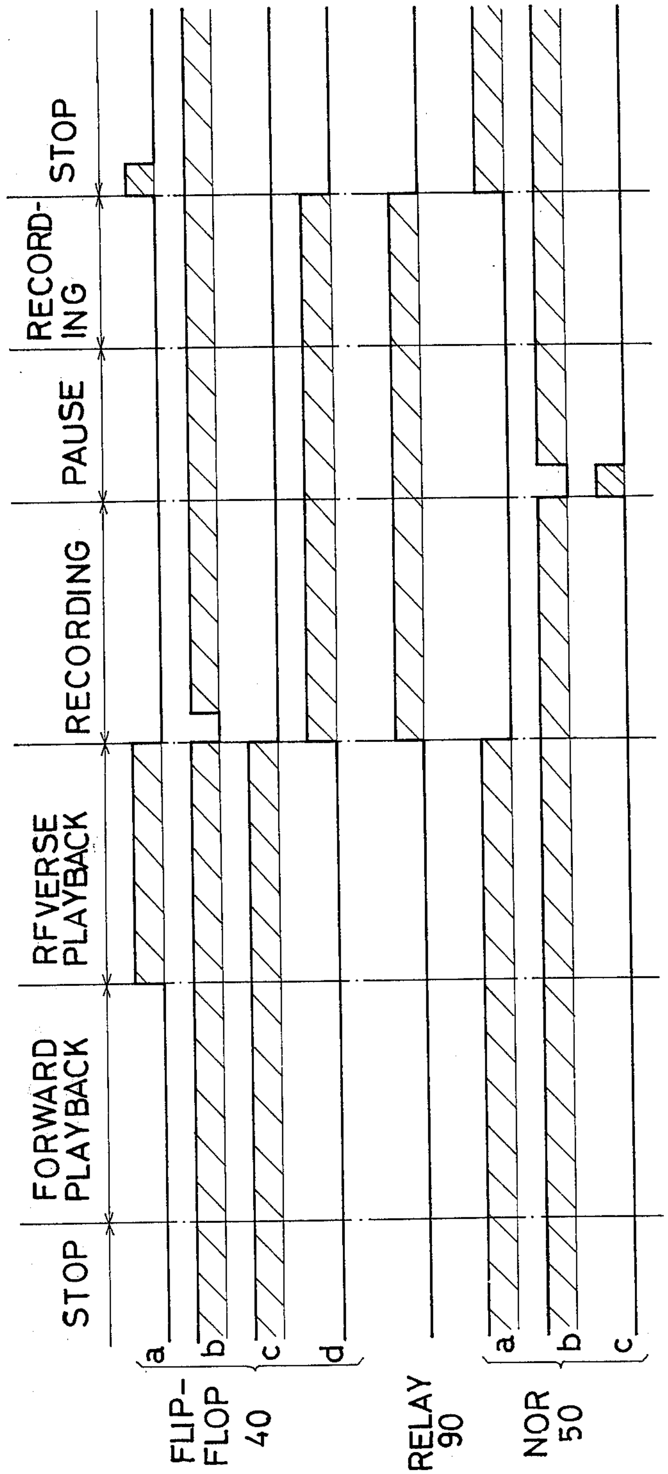

As a consequence, the first relay 82 is held energized while the second relay 86 becomes deenergized, as will be seen from FIGS. 2F and 2L, so that the magnetic tape is caused to run in its forward direction. Since the LO level signal is delivered as aforesaid to the set terminal *b* of the third flip-flop circuit 40, its output terminal *d* starts producing a HI level signal as seen in FIG. 2M thereby initiating conduction through the transistor in the third transistor switch circuit 88. The third relay 90 is now energized through the adjacent bias terminal +V2 as seen in FIG. 2N. With the recording/reproducing apparatus thus conditioned for recording operation, the desired information can be recorded on its magnetic tape running forwardly.

Pause

A shift from forward recording operation to a pause can be accomplished by the manual closure of the pause switch 18. The input terminal *b* of the NOR circuit 50 is then grounded or is supplied with a LO level signal as seen in FIG. 2—O, and since now a LO level signal is being produced from the output terminal *c* of the third flip-flop circuit 40, the NOR circuit 50 produces a HI level signal from its output terminal *c*. This HI level output signal from the NOR circuit 50 is delivered to the input terminal *a* of the first flip-flop circuit 22 thereby causing the same to produce a HI level signal from its output terminal *c* as seen in FIG. 2D. The first relay 82 is then deenergized as seen in FIG. 2F to condition the recording/reproducing apparatus for a pause. However, since the third flip-flop circuit 40 has its operating condition unaffected by the closure of the pause switch 18, the third relay 90 is held energized through its bias terminal +V2 as seen in FIG. 2N, so that the apparatus is ready for immediate resumption of recording operation.

In order to set the apparatus out of the pause, the forward playback switch 10 may be closed to introduce the ground potential to the input terminal *b* of the first flip-flop circuit 22 as previously mentioned. The first flip-flop circuit 22 is then caused to produce a LO level signal from its output terminal *c* as seen in FIG. 2D, and through the procedure already set forth, the first relay 82 becomes energized again to cause the magnetic tape to run forwardly. Since the third relay 90 has been held energized throughout the period of the pause, the recording operation can immediately be resumed only by the closure of the forward playback switch 10.

It is further possible according to the control system of the invention that the recording/reproducing apparatus be brought into a standby condition for immediate initiation of recording operation regardless of the operating condition the apparatus has been in. To this end the recording and pause switches 16 and 18 may both be closed. As a LO level signal is thus delivered to the input terminal *b* of the third flip-flop circuit 40, its output terminal *d* is caused to produce a HI level signal to initiate conduction through the transistor in the third transistor switch circuit 88 and hence to cause the third relay 90 to be energized through its bias terminal +V2. Let it now be assumed that the apparatus has been in forward playback operation. Since the NOR circuit 50 delivers its HI level output signal to the input terminal *a* of the first flip-flop circuit 22, a HI level signal is now produced from its output terminal *c*. The forward playback operation is now suspended, and the apparatus is held standing by for immediate initiation of recording operation.

For a shift from forward recording operation to a stop, the stop switch 14 may be closed to introduce the ground potential to the input terminals *a* and *b* of the NOR circuit 30 and hence to cause the same to produce a HI level signal from its output terminal *c*. This HI level output signal from the NOR circuit 30 is delivered, on the one hand, via the diode 36 to the input terminal *a* of the first flip-flop circuit 22 thereby causing the same to produce a HI level signal from its output terminal *c* as seen in FIG. 2D. Upon resulting production of a LO level signal from the output terminal *c* of the NAND circuit 74 as seen in FIG. 2E, the first transistor switch circuit 80 is turned off to deenergize the first relay 82. On the other hand, the HI level output signal from the NOR circuit 30 is delivered via the diode 42 to the reset terminal *a* of the third flip-flop circuit 40 thereby causing the same to produce a LO level signal from its output terminal *d* as seen in FIG. 2M. As the third transistor switch circuit 88 is resultantly turned off, the third relay 90 becomes also deenergized. The forward recording operation of the apparatus is thus terminated. It will be apparent that the reverse playback and other operations of the apparatus can be stopped through an identical procedure upon closure of the stop switch 14.

Although not represented in the graphs of FIG. 2, a shift from reverse playback to forward playback operation can be effected by the simple closure of the forward playback switch 10. For, in this manner, the first flip-flop circuit 22 operates to condition the apparatus for forward playback operation, whereas the second flip-flop circuit 26 is reset to terminate its reverse playback operation.

In the control system incorporating digital circuitry such as that herein disclosed, it is possible that upon closure of the power switch to apply the voltage to the bias terminals +V1 and +V2, noise signals be generated due to the rapid voltage variations thereby setting the apparatus in some undesired operation. It is to eliminate this defect that the resistance 32 and the capacitor 34 are connected between the ground and the interconnection between the stop switch 14 and the NOR circuit 30. In this manner, the capacitor 34 is gradually charged to its full capacity through the adjacent bias terminal +V1 upon closure of the power switch, so that the input terminals *a* and *b* of the NOR circuit 30 are held supplied with LO level signals for some time after the closure of the power switch because then these input terminals are held substantially grounded via the capacitor 34. Until the capacitor 34 becomes substantially fully charged, therefore, a HI level signal is delivered from the NOR circuit 30 to the reset terminals *a* of the first, second and third flip-flop circuits 22, 26 and 40 to prevent the apparatus from being erroneously conditioned for forward playback, reverse playback, or recording operation. It will be apparent that the electrostatic charge which has been stored in the capacitor 34 is released via the resistance 32 when the power switch is succeedingly opened.

As may have been understood from the foregoing description of the preferred embodiment of the invention, the set terminals *b* of the first, second and third flip-flop circuits 22, 26 and 40 are all applied with the prescribed positive voltage when the power switch of the apparatus is closed, and each flip-flop circuit is triggered when the control switch associated therewith is succeedingly closed to introduce the ground potential to its set terminal. It is possible in this manner to minimize the possibility of the apparatus being erroneously conditioned for any undesired operation due to the production of noise signals.

While the various objects of this invention, either explicitly stated or otherwise set forth, are believed to be fully accomplished by the preferred embodiment herein disclosed, it is also to be well noted that the invention itself is not to be restricted by the exact showing of the drawings or the description thereof. For example, the control switches may be of other than pushbutton type, and the outputs of the flip-flop circuits may be connected directly to their respective relays or equivalent means, instead of providing the gates and transistor switch circuits therebetween as shown in FIG. 1. It is further understood that the control system of this invention is applicable to apparatus of various types other than that herein described, such for example as that permitting both forward and reverse recording operations in addition to forward and reverse playback operations.

Thus, a latitude of modification, substitution and change is intended in the foregoing disclosure, so that it is appropriate that the invention be construed broadly and in a manner consistent with the fair meaning and proper scope of the following claims.

I claim:

1. In a recording/reproducing apparatus of the type including a record medium which can be caused to run in one and the opposite directions as required, a control system comprising, in combination:

a first control switch;

a first flip-flop circuit having a set terminal and a reset terminal and an output terminal, said set terminal of said first flip-flop circuit being connected to said first control switch whereby said first flip-flop circuit is triggered when said first control switch is actuated, said first flip-flop circuit comprising:

a first NOR circuit having first and second input terminals and an output terminal, said first and second input terminals of said first NOR circuit being connected to said set and reset terminals, respectively, of said first flip-flop circuit;

a second NOR circuit having first and second input terminals and an output terminal, said first input terminal of said second NOR circuit being connected to said output terminal of said first NOR circuit, said output terminal of said second NOR circuit being connected to said output terminal of said first flip-flop circuit; and a third NOR circuit having first and second input terminals and an output terminal, said first input terminal of said third NOR circuit being connected to said reset terminal of said first flip-flop circuit, said second input terminal of said third NOR circuit being connected to said output terminal of said second NOR circuit, said output terminal of said third NOR circuit being connected to said second input terminal of said second NOR circuit;

means connected to said output terminal of said first flip-flop circuit and adapted to condition the recording/reproducing apparatus for the motion of the record medium in said one direction when said first flip-flop circuit is triggered;

a second control switch;

a second flip-flop circuit having a set terminal and a reset terminal and an output terminal, said set terminal of said second flip-flop circuit being connected to said second control switch whereby said second flip-flop circuit is triggered when said second control switch is actuated, said second flip-flop circuit comprising:

a fourth NOR circuit having first and second input terminals and an output terminal, said first and second input terminals of said fourth NOR circuit being connected to said set and reset terminals, respectively, of said second flip-flop circuit;

a fifth NOR circuit having first and second input terminals and an output terminal, said first input terminal of said fifth NOR circuit being connected to said output terminal of said fourth NOR circuit, said output terminal of said fifth NOR circuit being connected to said output terminal of said second flip-flop circuit; and a sixth NOR circuit having first and second input terminals and an output terminal, said first input terminal of said sixth NOR circuit being connected to said reset terminal of said second flip-flop circuit, said second input terminal of said sixth NOR circuit being connected to said output terminal of said fifth NOR circuit, said output terminal of said sixth NOR circuit being connected to said second input terminal of said fifth NOR circuit;

means connected to said output terminal of said second flip-flop circuit and adapted to condition the recording/reproducing apparatus for the motion of the record medium in said opposite direction when said second flip-flop circuit is triggered;

a first diode connected between said output terminal of said first NOR circuit of said first flip-flop circuit and said reset terminal of said second flip-flop circuit, said first diode being adapted to reset said second flip-flop circuit when said first flip-flop circuit is triggered; and a second diode connected between said output terminal of said fourth NOR circuit of said second flip-flop circuit and said reset terminal of said first flip-flop circuit, said second diode being adapted to reset said first flip-flop circuit when said second flip-flop circuit is triggered.

* * * * *

UNITED STATES PATENT OFFICE

CERTIFICATE OF CORRECTION

Patent No. 3,930,266 Dated December 30, 1975

Inventor(s) Hiroshi Okamoto

It is certified that error appears in the above-identified patent and that said Letters Patent are hereby corrected as shown below:

On the cover sheet insert --- Assignee: Teac Corporation ---.

Signed and Sealed this

*Twenty-fourth* Day of *October 1978*

[SEAL]

*Attest:*

RUTH C. MASON
*Attesting Officer*

DONALD W. BANNER
*Commissioner of Patents and Trademarks*